United States Patent
Mestha et al.

(10) Patent No.: US 7,804,614 B2
(45) Date of Patent: Sep. 28, 2010

(54) METHOD AND SYSTEM FOR ACQUISITION AND STORAGE OF IMAGE JOB MODEL INCLUDING IMAGE INFORMATION AND IMAGING DEVICE PRODUCTION STATE PERFORMANCE INFORMATION

(75) Inventors: Lalit Keshav Mestha, Fairport, NY (US); Ann Lerene McCarthy, Lexington, KY (US); Shriram V. Revankar, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1009 days.

(21) Appl. No.: 11/585,463

(22) Filed: Oct. 24, 2006

(65) Prior Publication Data

US 2008/0145125 A1 Jun. 19, 2008

(51) Int. Cl.
*G06F 15/00* (2006.01)
*B41J 11/44* (2006.01)
(52) U.S. Cl. ........................ 358/1.15; 400/76
(58) Field of Classification Search ................ 358/1.15, 358/1.1, 1.9, 1.13, 1.14, 1.18, 3.23, 442, 358/402, 406, 468, 470, 1.16; 400/76, 62; 715/201, 274; 705/52
See application file for complete search history.

(56) References Cited

U.S. PATENT DOCUMENTS 6,809,837 B1 * 10/2004 Mestha et al. ................ 358/1.9
2004/0257596 A1 12/2004 Mestha et al.

OTHER PUBLICATIONS

U.S. Appl. No. 11/099,589, filed Apr. 6, 2005, Mestha, et al.

* cited by examiner

*Primary Examiner*—Saeid Ebrahimi Dehkordy
(74) *Attorney, Agent, or Firm*—Fay Sharpe LLP (57) ABSTRACT

A method and system is provided for obtaining an archival model of a selected print job executed in a network imaging system comprised of a plurality of imaging engines. The print job is archived to include job data comprising the imaging information defining the desired job and the production status performance data of the particular engine at about the time of the executing of the job. The job data and the engine performance data are associated and archived for later retrieval for enhanced temporal and distributed consistency in a reprinting of the job.

18 Claims, 6 Drawing Sheets

METHOD AND SYSTEM FOR ACQUISITION AND STORAGE OF IMAGE JOB MODEL INCLUDING IMAGE INFORMATION AND IMAGING DEVICE PRODUCTION STATE PERFORMANCE INFORMATION

INCORPORATION BY REFERENCE OF A U.S. PATENT

The disclosure of the following U.S. Patent hereby is incorporated by reference, verbatim, and with the same effect as though the same disclosure were fully and completely set forth herein: U.S. Pat. No. 6,809,837 B1, "On-line model prediction and calibration system for a dynamically varying color reproduction device", issued 26 Oct. 2004 to Lingappa K. Mestha et al., assigned to Xerox Corporation.

INCORPORATION BY REFERENCE OF A U.S. PATENT APPLICATION PUBLICATION

The disclosure of the following U.S. Patent Application Publication hereby is incorporated by reference, verbatim, and with the same effect as though the same disclosure were fully and completely set forth herein: U.S. Patent Application Publication No. 2004/0257596 A1, "Method for standardizing input CMYK values for clustered printing environments", published 23 Dec. 2004 by Lalit K. Mestha et al., corresponding to application Ser. No. 10/465,457, filed 19 Jun. 2003, assigned to Xerox Corporation.

INCORPORATION BY REFERENCE OF A PENDING U.S. PATENT APPLICATION

The disclosure of the following U.S. Patent Application Publication hereby is incorporated by reference, verbatim, and with the same effect as though the same disclosure were fully and completely set forth herein: U.S. Patent Publication No. 2006-0227395 A1, "Systems and methods for printing images outside a normal color gamut in image forming devices", published 12 Oct. 2006 by Lalit K. Mestha et al., corresponding to application no. application Ser. No. 11/099,589, filed 6 Apr. 2005, assigned to Xerox Corporation.

FIELD

The subject invention pertains to the art of color management and image/text printing or display systems, and is especially applicable to a method and apparatus wherein a controller monitors production state performance data of an imaging device generally concurrently with the generating of the image by the device for modeling the job as a composite of both the image data and the real-time performance operational data of the imaging device. The model can then be stored and accessed for enhanced temporal and distributed consistency in a multi-device imaging network.

BACKGROUND

In today's business and scientific world, color has become essential as a component of communication. Color facilitates the sharing of knowledge and ideas. Companies involved in the development of digital color print engines are continuously looking for ways to improve the total image quality of their products. One of the elements that affects image quality is the ability to consistently produce the same quality image output on a printer from one day to another, from one week to the next, month after month. Colors on a printer tend to drift over time due to ink/toner variations, temperature fluctuations, type of media used, environment, etc. There has been a long felt commercial need for efficiently maintaining print color predictability, particularly as electronic marketing has placed more importance on the accurate representation of merchandise in illustrative print or display media.

Documents, i.e., viewable representations in either electronic or print format and inclusive of text, postures, graphics or other illustrative forms of any kind, are generally created electronically with sections from various input devices such as, for example, scanners, cameras, computer graphics, etc., in the "creative" stage of the production workflow. The documents are designed by assembling their contents using various layout tools. They are then assembled into jobs and evaluated for acceptability including design color quality. They are then typically proofed either on a monitor or on a workgroup digital printer. Up to this point of the document life cycle, typically, a standard reference press color model is used to estimate the expected print appearance and is retained with the electronic document. In other cases, graphic design color models are retained in the electronic document. In either case, when the electronic document is delivered from the "creative" stage of the workflow to the prepress and production stage, the colors carried in the designed document have to be transformed to press colors; i.e., the primary colors of whatever image forming device is being employed. In an automated color management environment, the original color model information delivered with the design document (either a standard reference press color model or a graphic design color model) is used as the "source" definition for the transform, and the actual (not measured real-time) press color model is applied as the "destination" for the transform. In a manual color management environment, a default press color transformation is applied, followed by manual on-press controls used to adjust the print results. In either case, typically, if the job is to be split and produced through more than one print system (print engine to print engine consistency), then manual tuning of those print systems, using on-press controls such as, for example, Digital Front End TRCs (Tone Reproduction Curves), is used to improve the match before production is initiated. Typically, press proofs are required during this match tuning process.

When a job has already been produced, and a future reprint may be expected, then the electronic document is retained, either in original design form with the embedded or associated graphic design color models or standard reference press color models, or in production form with the embedded or associated actual (not measured real-time) press color model. If production reprint color match is required, then a hardcopy sample from the first production run is retained for reference during reprint. At the time of reprint, manual tuning of the print system(s), using on-press controls such as, for example, Digital Front End TRCs, is used to improve the match to the original sample before production is initiated. Typically, press proofs are required during this match tuning process.

As is known, current production print shop owners want faster turn-around time in their print jobs. This means time pressures are increasing, requiring more uptime for presses. Many printshops own multiple presses to improve turn-around time.

As increasing numbers of press systems within a print shop operate in parallel, there will be an enhanced need for distributed optimization of interconnected workflows to ensure output consistency with little or no interruption. Distributed optimization of interconnected workflows is required to ensure output consistency when a job is split and produced through multiple print systems (print engine to print engine consistency), and to ensure output consistency when a job is produced at a later time (temporal consistency).

As is known, present methods of producing documents do not measure and retain information regarding the actual production state of the press.

To reduce cost and improve productivity in the prepress, production, and reprint life cycle, real-time feedback from the press of its latest functional models, defining the real-time correspondence between color encoding value and resulting measured color, becomes useful. These models contain reproducible color information remotely obtained from the press, and can include accommodation for screening, media, and other print condition specifics. These real-time, accurate color models will help prepress operators, or (preferably) automated color conversion workflow components, to carry out prepress functions efficiently on the documents. Accurate knowledge of the press color capabilities can improve the production efficiency considerably.

A job ticket is a stored program describing the preparation of a document, which can be created and edited anywhere and executed on a production device anywhere to generate complete sets of finished documents. Job tickets are specifically designed to provide the defining attributes for each portion of a print production process. They have evolved into industry-wide standards such as, for example, the Job Description Format ("JDF") for the publishing industry. Current JDF standards can contain either standard reference press color models such as, for example, SWOP, CMYK, DeviceN, Pantone Named Colors, etc., specific actual (not measured real-time) press color models, or graphic design color models such as, for example, Adobe RGB. However, current job ticket process information does not include the idea of a real-time adjustment or update of the actual press color model.

Thus, there is a need for the present development.

SUMMARY

A xerographic imaging system is provided having enhanced distributed and temperol imaging consistency amongst image forming devices therein. An image forming device generates an image from print job data. A controller measures production state performance data representative of the operational forming of the image by the forming device at about a time of the generating. An image repository stores the print job data and the production state performance data in association as an archival model of the generated image.

A method is provided for enhancing distributed and temporal imaging consistency in a network imaging system including a plurality of image forming devices. An image is generated from one or more of the forming devices from job data representing the image. Production state performance data of the generating forming device is obtained at about a time of the generating of the image. The job data and the production state performance data are associated as a model representation of the generated image. The model representation is stored in an image repository as an archival record of the image. For re-imaging of the image at a later time, later production state performance data is obtained from a later generating image forming device at about a time of the later generating. The model representation stored image repository is adjusted in accordance with the later production of state performance data for enhancing the imaging consistency between the generated image and the re-imaging of the image. The later generated image forming device can then re-image the image. The real-time production state data selectively includes media, halftone, color model, image information, fonts, process setpoints, process actuators, native response of the print engine, TRCs, and color difference numbers such as deltaE2000 numbers.

A system is provided for enhanced archival storage and reprinting consistency of print job data. An image forming device generates an image from the print job data wherein the print job data comprises image information and image forming information. An image repository stores the image forming information and image information for selective communication to another image forming engine or the same image forming engine upon a desired reprint of the print job data.

Other disclosed features and aspects of the embodiments are provided.

DETAILED DESCRIPTION

Figure 6:
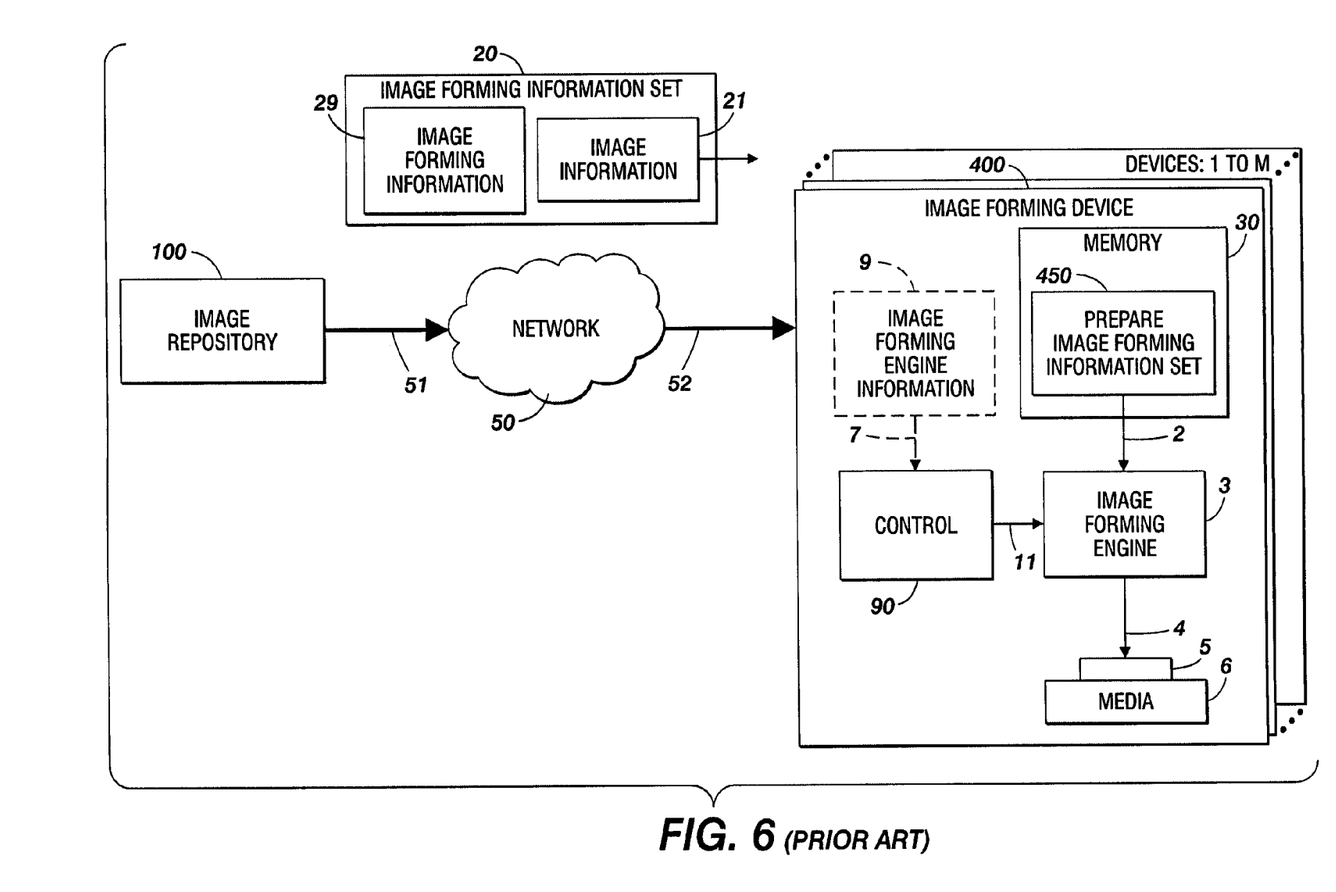
FIG. 6 includes an imaging system comprising a plurality of image forming devices, as in the prior art.

With reference to FIG. 6, conventional network imaging systems typically comprise the communication 51 of image data from either a workstation or computer terminal including an image repository 100 wherein the data defining the job is in a job ticket as communicated 52 to any of 1 to M image forming devices 400. The image forming device 400 will include an image forming engine 3 which imparts 4 the imaging data onto a media 6 to generate the outputted image 5. In order to accomplish this result, the image forming device typically will require an image forming information set 20 comprised of the image information 21 (i.e., the desired image itself) and image forming information 29 (i.e., fonts, paper size, job length and other job related attributes). The engine 3 receives 2 the prepared image forming information set 450 from device memory 30. How the generated image actually appears though is also affected by image forming engine information 9 comprising how the engine 3 actually prints the data encoded values at the point in time of generating the image, i.e., the particular image forming device's production state performance data at a particular time. Such performance data includes, for example, media, halftone, color model, image information, fonts process setpoints, process actuators, native response of the print engine, TRCs, and color difference numbers such as deltaE2000 numbers. The engine 3 also receives 11 from controller 90 the particular engine information 9 corresponding 7 to the forming of the image 5. Both the production state performance data and the image forming information set representing the image together comprise relevant characteristic data defining a particular job.

Figure 1:
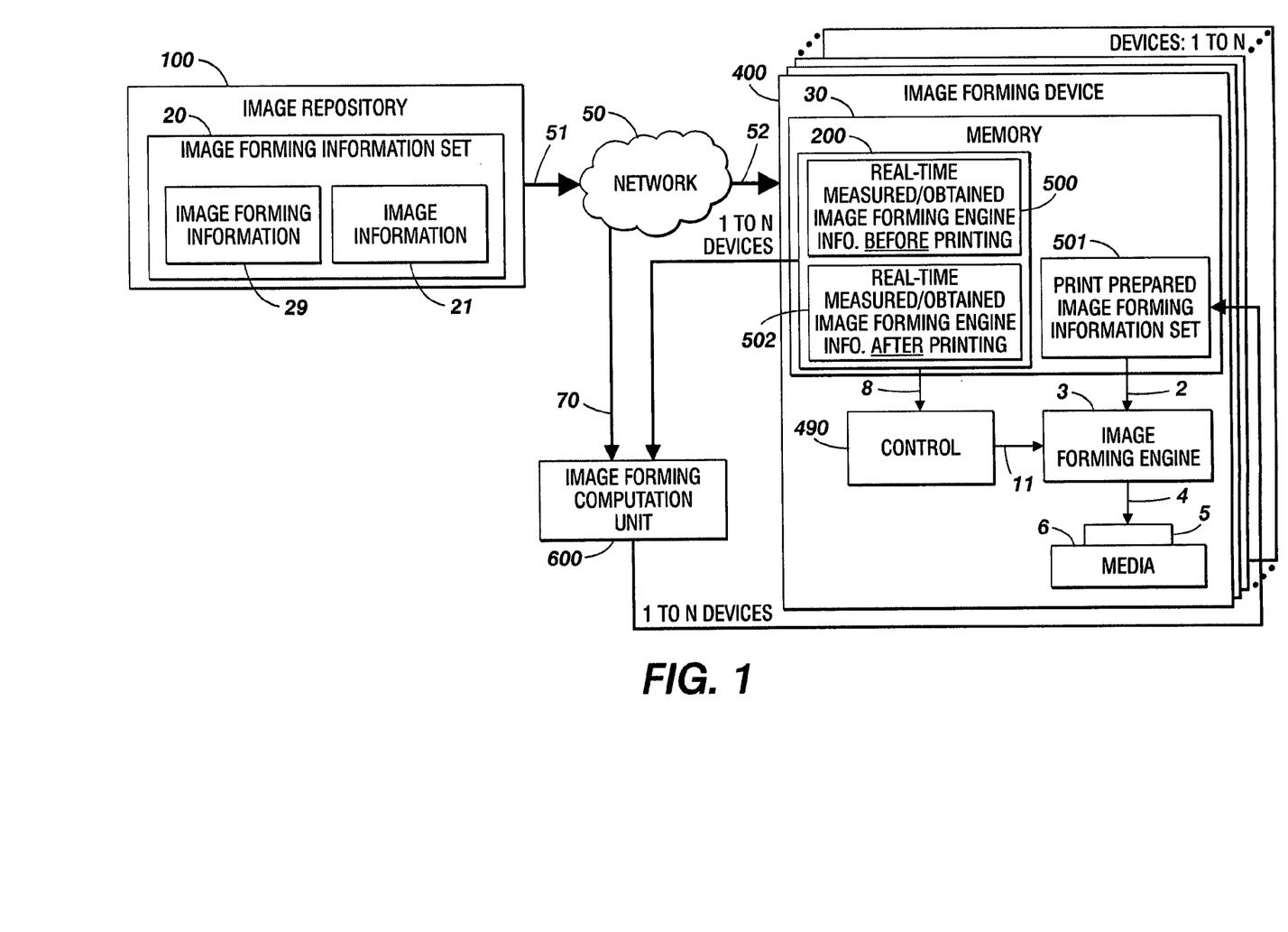
FIG. 1 comprises a network imaging system comprised of a plurality of image forming devices wherein image forming engine information comprising production state performance data of the image forming devices is monitored as representative data defining the generating of the image.

With reference to FIG. 1, it can be seen that the memory 30 of the image forming device 400 not only includes the image forming information set 501 but also storage of the image forming device production state performance data comprising both real-time measured/obtained image forming engine information before printing 500 and real-time measured/obtained image forming engine information after printing 502. The measured informations 500 and 502 can be typically obtained through a test target of preselected template settings. What is important is that the production state performance of the imaging device 400 is measured at about the time of the generating of the desired image so that a record comprising both what the image was and how it was made can be maintained. The engine 3 is controlled by controller 490 which recognizes 8 whatever the image forming engine information is at the time of the forming of the image 5. An almost exact record of this engine information is the data 500, 502. The communication of the measured production state performance data 200 to an image forming computation unit 600 for association with the corresponding image forming information set 20 received 70 through network 50 enables an archival characterization model of the generated image at the time of its generating by the image forming engine 3. Thus, an actual real-time functional model of the image forming device, providing actual data correspondence between color and coding values and measured print color results, as well as the particular details of color to separation mapping algorithms, e.g., UCR/GCR strategy, user TRCs, is readily made available at the prepress stage. The standard recognized in the industry for such color model information is an ICC profile (ICC Output Profile, ICC Named Color Profile, plus valid private tags in the ICC profiles). An ICC Profile contains one or more elements that are used in combination to map device color values to and from ICC Profile Connection Space color values. ICC Profile Connection Space (ICC PCS) is a colorimetrically-defined, device-independent color encoding that is standardized to provide cross-vendor, archival, color connectivity.

In this embodiment, using an ICC profile for the actual press, the relative colorimetric intent device-to-PCS elements, defined in the ICC profile AToB1Tag, and the relative colorimetric intent PCS-to-device elements, defined in the ICC profile BToA1Tag, can be refreshed, populated, with the actual real-time functional models of the press (providing actuals of correspondence between color encoding values and measured print color results, and particulars of color to separation mapping algorithms, e.g., UCR/GCR strategy, user TRCs).

The ICC profile AToB1Tag can contain up to five processing elements: a set of one dimensional curves, a 3 by 3 matrix with offset terms, a set of one dimensional curves, a multidimensional lookup table, and a set of one dimensional output curves. Data are processed using these elements via the following sequence:

("A" curves)→(multidimensional lookup table)→("M" curves)→(matrix)→("B" curves).

It is possible to use any or all of these processing elements. At least one processing element must be included. The following combinations are allowed for the lutAtoBType:

B
M - Matrix - B
A - CLUT - B
A - CLUT - M - Matrix - B

Other combinations may be achieved by setting processing element values to identity transforms. Refer to Specification ICC.1:2001-12, section 6.5.11 lutAtoBType for more information.

The ICC profile BToA1Tag can contain up to five processing elements: a set of one dimensional curves, a 3 by 3 matrix with offset terms, a set of one dimensional curves, a multidimensional lookup table, and a set of one dimensional output curves. Data are processed using these elements via the following sequence:

("B" curves)→(matrix)→("M" curves)→(multidimensional lookup table)→("A" curves). It is possible to use any or all of these processing elements. At least one processing element must be included. The following combinations are allowed for the lutBtoAType:

B
B - Matrix - M
B - CLUT - A
B - Matrix - M - CLUT - A

Other combinations may be achieved by setting processing element values to identity transforms. Refer to Specification ICC.1:2001-12, section 6.5.12 lutBtoAType for more information.

The foregoing describes the present embodiments using color models as an example, for preserving color models by forming image forming information files, by creating an image repository, and this will be hereinafter further explained relative to a method/device to create or retrieve images on the same or different image forming device at a later time, when desired, with enhanced distributed and/or temporal imaging consistency, but the subject embodiments are also applicable to other type of modeling systems for a particular imaging job.

Figure 2:
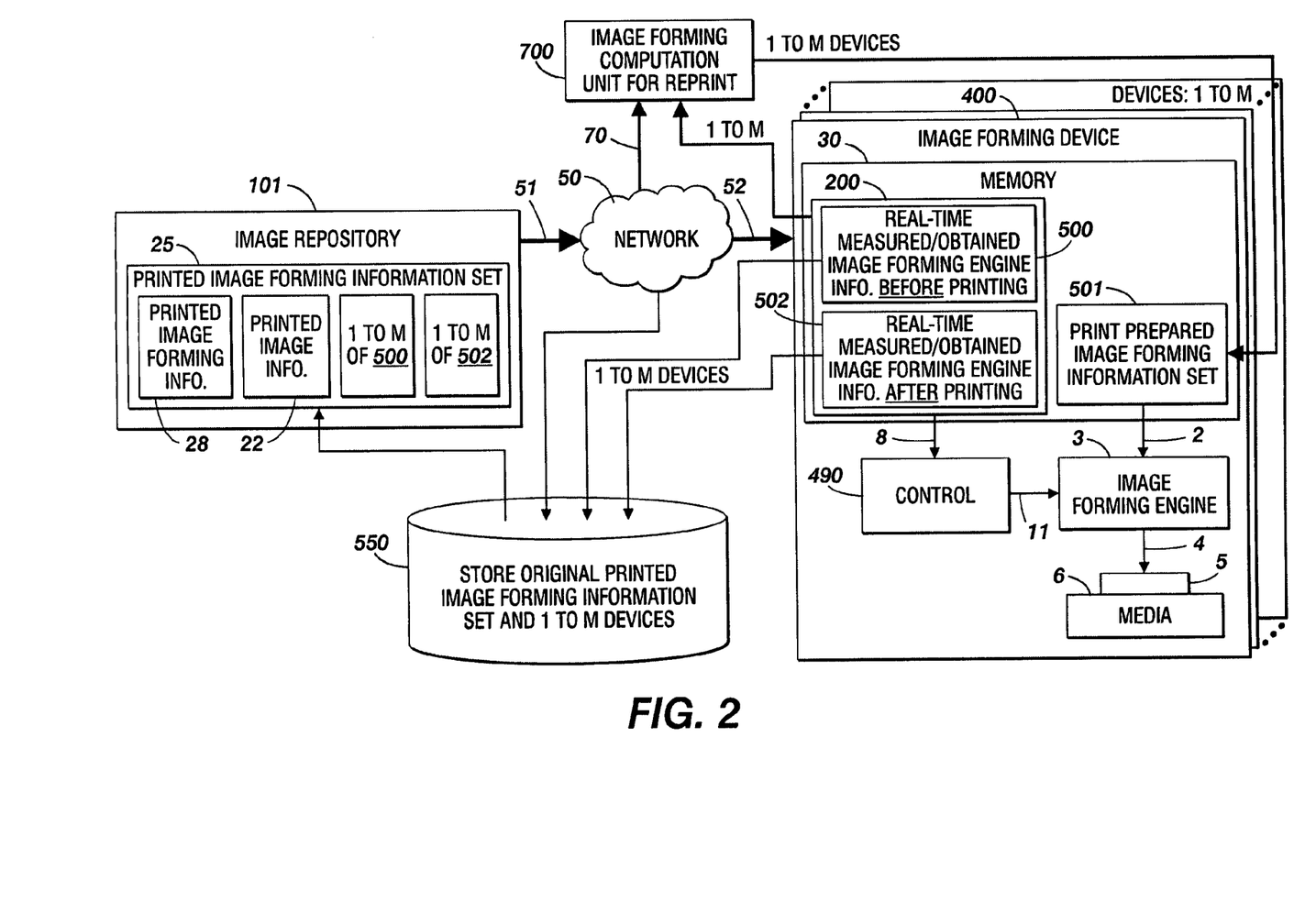
FIG. 2 comprises the imaging system of FIG. 1 further including a storage device for storing both image data and the image forming engine information and a controller for adjusting image data in accordance with the image forming engine information of a later generating imaging device for enhanced temporal consistency of the imaging.

With reference to FIG. 2, in accordance with another aspect of the embodiments, the actual real-time functional model of the press (providing actual detailed measurements of correspondence between color encoding values and measured print color results, and particulars of the color to separation mapping algorithm) is embedded in the storage device 550 in the standardized form in the JDF job ticket to be retained with the job content for use during a later production process so that the later production process will be substantially consistent with the original production process.

Using JDF 1.2, a refreshed, actual press, output profile can be retained as the source definition in the JDF process resources associated with each job file.

The resource, ElementColorParams/ColorSpaceConversionOp, and its attribute FileSpec (with ResourceUsage="SourceProfile"), with the attribute ElementColorParams/ColorSpaceConversionOp/SourceCS defined as "CMYK", can be used to retain the real-time refreshed actual press output profile, defining it as the source encoding, associated with the job file, for any future production. This approach can be used when the job files are archived after final color-rendering to the refreshed, actual press color encoding.

On the other hand, using JDF 1.2, if the job files are archived in original form with the intent to re-create the actual press color-rendering at the time of each successive printing, the refreshed, actual press, output profile can be retained as the Actual Output definition in the JDF process resources associated with each job file. The resource, ElementColor-Params/FileSpec (with ResourceUsage= "ActualOutputProfile"), can be used to retain the real-time refreshed actual press output profile, defining it as the intended actual output device encoding, associated with the job file, for any future production.

The foregoing describes the present embodiments using JDF job tickets as an example, as a means for formatting and associating image forming information and printed image forming information with print job files. The subject embodiments are also applicable to other types of print job ticket and print job control mechanisms in particular print systems. With this feature, when the document is retrieved for reprint, the actual real-time functional models of the press and other stored attributes (e.g., media and screening selections), used to produce the document previously, can be easily obtained in electronic form. When the hardcopy reprint is required, then the retrieved electronic document can be printed using the stored attributes and a new actual real-time functional model of the press. The document can be reproduced on the same or a different printer, with a color appearance corresponding to the original production. When the previous "actual" to new "actual" reprint transform is computed using direct four-to-four (e.g., a black preserving transform based on stored and retrieved particulars of color to separation mapping algorithms) methods known in the art, superior matching results will be achieved.

With reference to FIG. 2 it can be seen that the storage device 550 stores the original print information of image forming information set 20 in association with the measured real-time image forming engine information 500, 502 as an archival record of the generating of the original image. When a reprint is desired, the image repository 101 is adjusted to expand the image forming information set to a new printed image forming information set 25 comprised of not only printed image forming information 28 and printed image information 22, but also the measured/obtained image forming engine information 500, 502 corresponding to the performance state production data of the image forming device at the time of the generation of the original image. The printed image forming information set 25 is communicated 51 through network 50 to the image forming computation unit for reprint 700 which additionally will obtain the real-time measured/obtained image forming engine information both before and after the reprinting to adjust the color coding values for the reprint to substantially match the output values of the originally printed image. The computation unit 700 performs such an adjustment, so that the print prepared image forming information set 501 which is communicated to the image forming engine along with the real-time performance data that is communicated from controller 490 after its communication 8 from the image forming device memory 30, will facilitate a consistent reprint with the original print job.

Figure 3:
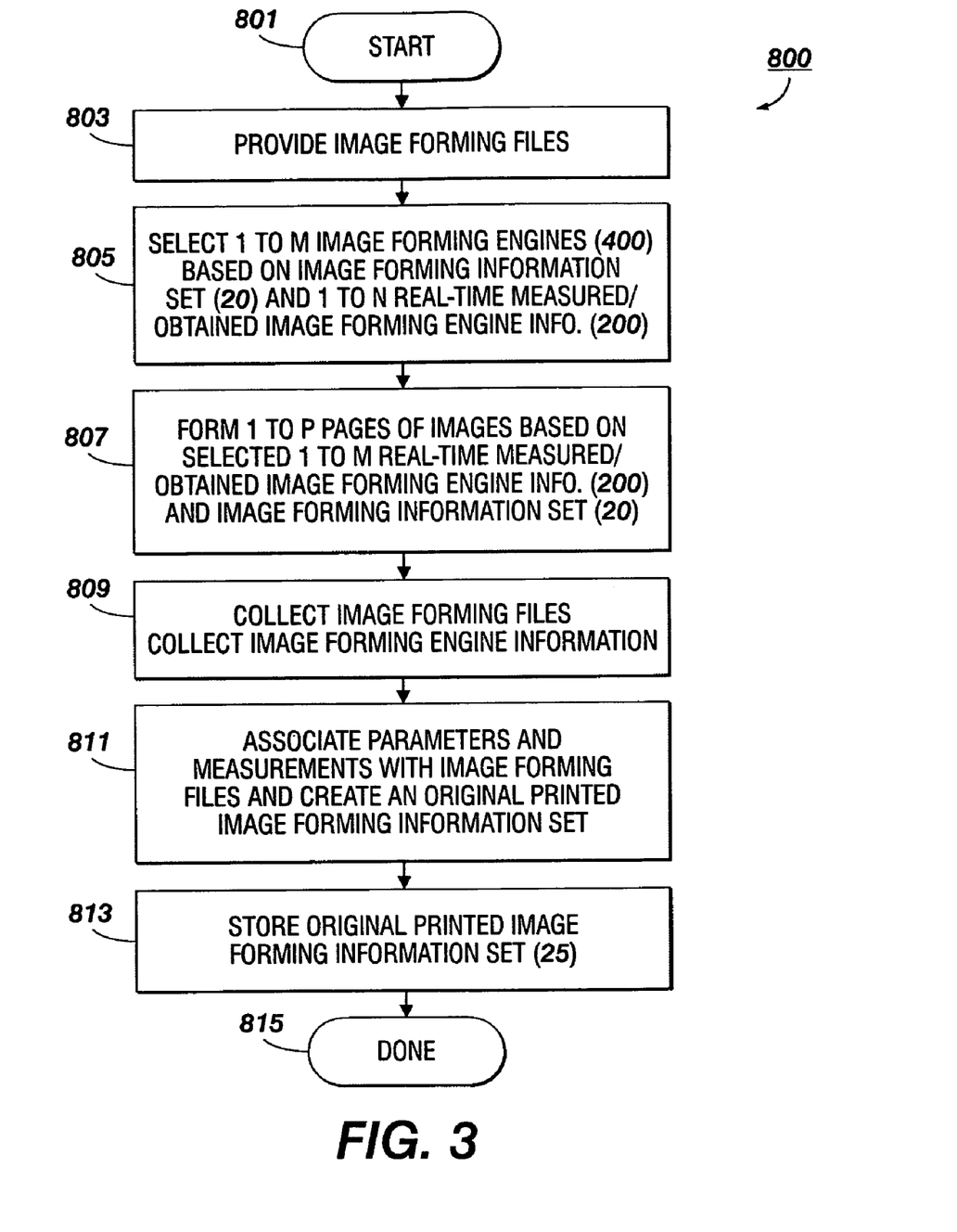
FIG. 3 depicts a method for forming a printed image forming information set or file comprising an association of image forming data and engine production state performance data.

With reference to FIG. 3, a flowchart for a method 800 for forming the printed image forming information file 25 is shown. Upon a start 801, the method image forming files are provided 803 and typically comprise image forming information 29 and image information 21. An image forming engine 400 is selected 805 based on image forming information set 20 and the measured/obtained image forming engine information 200. From one to P pages of images based on the selected image forming engine and image forming engine information is formed 807 based on the image forming information set 20. The image forming files and the image forming engine information data is collected 809 and associated 811 in accordance with the parameters and measurements of the image forming files to create an original printed image forming information set comprising a representation of the production state performance data of the forming device at the time of the generating and associating the job data of the image and the production state performance data as a model representation of the generated image as an archival record thereof. The archival record comprises the original printed image forming information set 25 and is stored 813 for later selective retrieval, wherein the creation and storage of the file is done 815.

Figure 4:
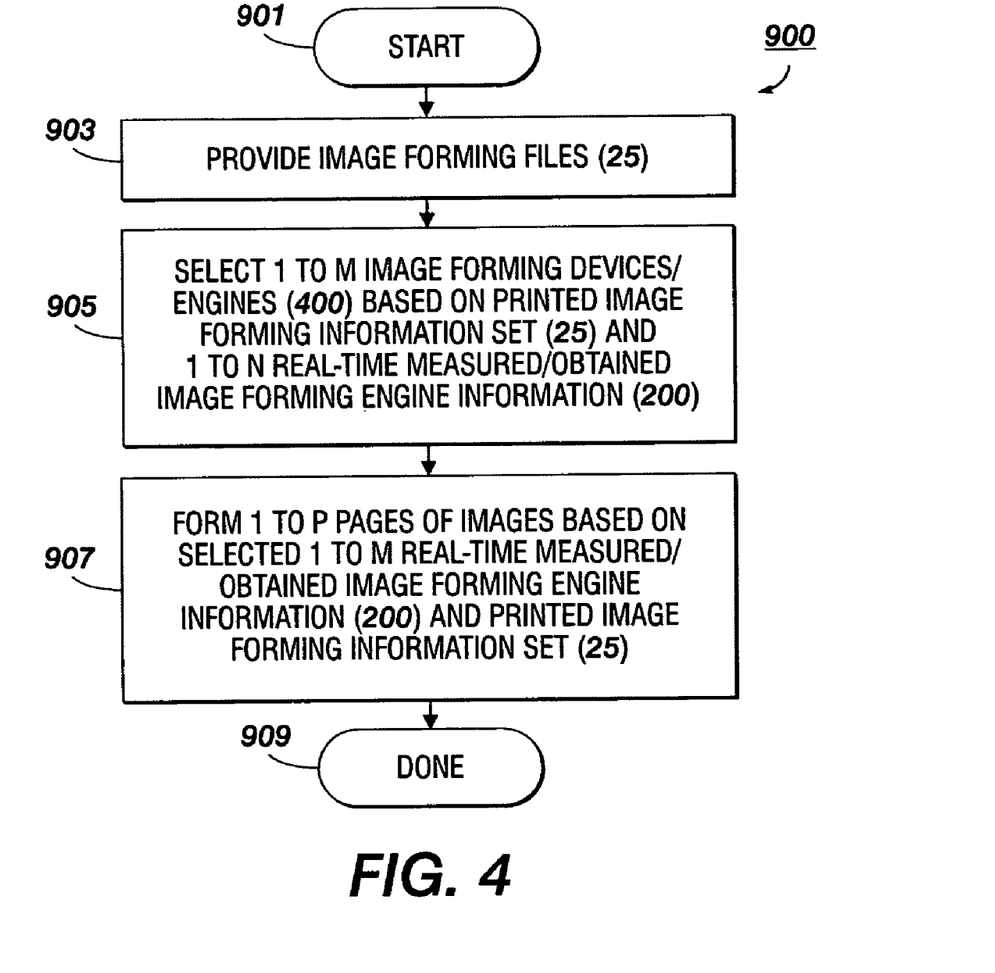
FIG. 4 depicts a method for forming an image based on an earlier printed image forming information set or file and a current image forming information of the same or another image forming device for consistent reprint of the image.

With reference to FIG. 4, a method 900 is depicted for forming/reprinting an image based on a printed image forming file 25 and a current image forming engine information file before printing on a selected image forming device. Upon start 901, the image forming files 25 are provided through the network 50 to the image forming device 400 which has been selected 905 for the generating of the image. The image forming file not only comprises the printed image forming information and printed image information, but also the production state performance data of the generating at the time that the image was originally generated. A computation unit 700 must then obtain real-time measured/obtained image forming engine information 200 from the selected image forming device generating the reprinted image so that the performance data of the archived image forming file 25 can be matched to the performance of the reprinting image forming device. Upon adjustment to obtain such a match, the appropriate image files can be formed 907 for the generating of the reprinted image, and therein the reprinting is done 909.

Figure 5:
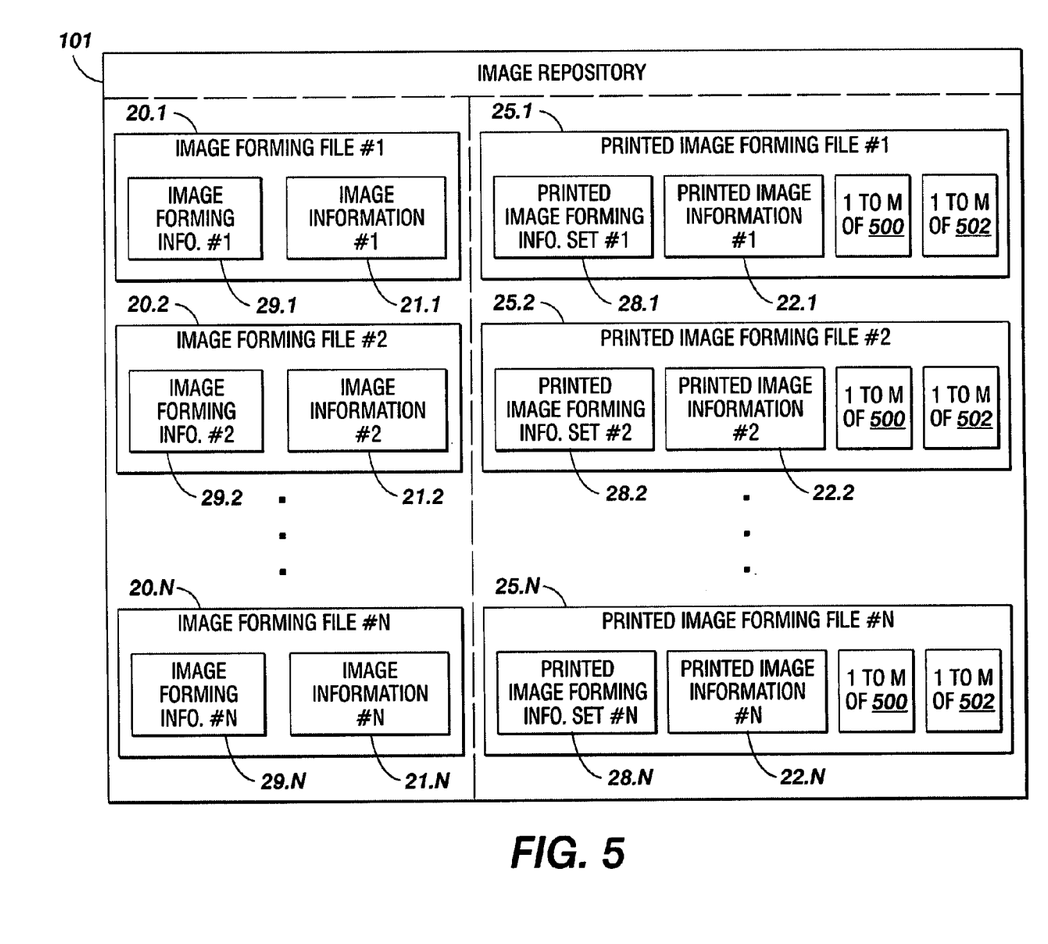
FIG. 5 comprises a detailed image repository.

FIG. 5 illustrates an image repository 101 comprised of a plurality of image forming files associated with a printed image performing file including image engine performance data. More particularly, it can be seen that the image forming file #1 20.1 includes the image forming information #1 and image information #1 21.1 which is in turn associated with the printed image forming file number 1 including the printed image forming information set #1 28.1, printed image information #1 22.1 and the forming engine production state performance data measured both before and after test printing. Other image forming files 20.2, 20.N and printed image forming files 25.2, 25.N and likewise stored in the repository 101.

Although the embodiments disclosed above discussed production state performance data measured both before and after image printing, it is within the scope of the subject embodiments to select either performance data before the generating of the image, after generating the image, or both before and after the generating of the image.

The present embodiments comprise a model that provides a complete color volume correspondence between color encoding values and measured print color results that is updated in real-time during the preparation of a print job. The actual real-time press color model is retained with the job in the job repository, such that the retained accurate record of print color appearance can be used, in combination with a new (at the time of reprint) real-time actual press color model, to automate a reprint match.

With the use of inline color sensors such as the LCLED spectrophotometers, or full/partial width array spectrophotometers, color models of printers can be easily constructed. Such modeling can be used to construct the CMY to L*a*b* forward LUTs with GCR/UCR in the forward model or CMYK to L*a*b* LUTs without GCR/UCR LUTs in the forward map. For example, the color model can be one of the following:
(a) simple LUT with corresponding input-output map for uniformly sequentially distributed nodes in the input space,
(b) subset of the critical nodes obtained using LUT compression algorithms.
(c) a parametric model (e.g., Neugebauer model) of the input-output map.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for enhanced archival storage and reprinting consistency of print job data, comprising: an image forming device for generating an image from the print job data wherein the print job data comprises image information and image forming information, and
wherein the image forming information comprises real-time production state data of the image forming device, and wherein the real-time production state data selectively includes media, halftone, color model, image information, fonts, process setpoints, process actuators, native response of the print engine "TRCs, or color difference numbers such as deltaE2000 numbers; and, an image repository for storing the image forming information and image information for selective communication to another image forming engine or the image forming engine upon a desired reprint of the print job data.

2. The system of claim 1 wherein the image information and image forming information are associated in the image repository.

3. The system of claim 2 wherein the image information and image forming information are associated by time in the image repository as a characterization model of the generated image at a time of the generating by the image forming engine.

4. The system of claim 3 wherein the characterization model includes real-time measured image forming engine information.

5. The system of claim 4 wherein the real-time measured image forming engine information comprises engine information selectively measured before or after the generating of the image.

6. The system of claim 5 wherein the engine information comprises test pattern generating results.

7. The system of claim 1 further including an image forming computation unit for associating the image information with the image forming information of the image forming device.

8. The system of claim 1 wherein the production state data includes real-time correspondence measurements between color-encoding values and print results of the image forming device.

9. The system of claim 1 wherein the production state data includes real-time correspondence measurements of color to separation mapping algorithms.

10. The system of claim 1 wherein the production state data is embedded in a job description format ticket associated with the print job data and stored in the image repository.

11. A method for enhancing distributed and temporal imaging consistency in a networked imaging system including a plurality of image forming devices, comprising: generating an image from one or more of the forming devices from job data representing the image; obtaining production state performance data of the generating forming device at about a time of the generating; associating the job data and the production state performance data as a model representation of the generated image; storing the model representation in an image repository as an archival record of the image; and re-imaging of the image at a later time including: obtaining later production state performance data from a later generating image forming device at about a time of the later generating; adjusting the model representation and the later production state performance data for enhancing imaging consistency between the generated image and the re-imaging of the image; and, re-imaging the image with the later generating image forming device.

12. The method of claim 11 wherein the adjusting comprises adjusting coded values of the model representation so that output values of the re-imaging comprising the later production state performance data and job data substantially match output values of the image as originally generated.

13. The method of claim 12 wherein the forming device that generated the image and the later generating image forming device comprise different ones of the forming devices.

14. The method of claim 12 wherein the forming device that generated the image and the later generating image forming device comprise a same one of the forming devices.

15. The method of claim 11 wherein the obtaining the production state performance data comprises measuring output values of the generating forming device in response to a test pattern at a time selected from one of either just before, just after or both just before and just after, the generating of the image.

16. The method of claim 15 further including re-imaging of the image at a later time with another one of the forming devices and further including obtaining production state performance data of the other one forming device at about a time of the re-imaging and adjusting coded values of the job data so that the performance data of the other one forming device is substantially consistent with the measured output values of the generating forming device.

17. The method of claim 11 further including adjusting the model representation and the production state performance data of the plurality of image forming devices for enhancing imaging consistency among the outputted images generated by the plurality of image forming devices.

18. A xerographic imaging system having enhanced distributed and temporal imaging consistency between image forming devices networked therein, comprising:
an image forming device for generating an image from print job data wherein the print job data comprises image information and image forming information, and wherein the image forming information comprises real-time production state data of the image forming device, and wherein the real-time production state data selectively includes media, halftone, color model, image information, fonts, process setpoints, process actuators, native response of the print engine, TRCs, or color difference numbers such as deltaE2000 numbers; a controller for measuring production state performance data representative of operational forming of the image by the forming device at about a time of the generating; and, an image repository wherein the image data and the production state performance data are associated as an archival model.

* * * * *